United States Patent [19]

Hirschberg

[11] 4,184,737
[45] Jan. 22, 1980

[54] NONLINEAR OPTICS MICROSCOPE INTERFEROMETER

[76] Inventor: Joseph G. Hirschberg, 1046 Alfonso Ave., Coral Gables, Fla. 33146

[21] Appl. No.: 902,822

[22] Filed: May 4, 1978

[51] Int. Cl.[2] .............................................. G02B 21/14
[52] U.S. Cl. ...................................... 350/13; 356/51;
356/349; 356/357; 356/359
[58] Field of Search .................. 350/12, 13; 356/35.5,
356/51, 349, 357, 359

[56] References Cited
PUBLICATIONS

Chang et al., "Relative Phase Measurement Between Fundametal and Second-Harmonic Light", *Phys. Rev. Lett.*, vol. 15, No. 1, pp. 6–8, 7/65.

*Primary Examiner*—John K. Corbin
*Assistant Examiner*—Matthew W. Koren
*Attorney, Agent, or Firm*—Meredith P. Sparks

[57] ABSTRACT

An interference microscope based on the principles of nonlinear optics comprises an ordinary microscope which has three additional internal optical elements, namely, two nonlinear frequency-doubling platelets and an infra-red filter, each suitably positioned. Light from an infra-red laser light source is passed through the platelets and filter, and the phase shift of the resulting image in the visible spectrum at the eyepiece is measured in order to calculate the optical thickness of a transparent object.

10 Claims, 1 Drawing Figure

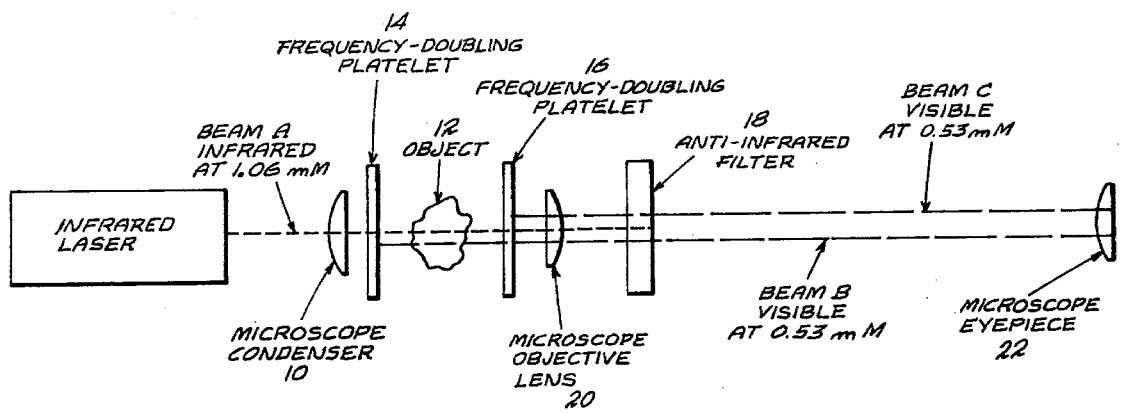

NONLINEAR OPTICS MICROSCOPE INTERFEROMETER

BACKGROUND OF THE INVENTION

An ordinary microscope can disclose detail where the transparency of the object varies. Many biological objects, however, are nearly completely transparent, and consequently almost invisible to the classical microscope. Phase contrast, discovered by Frits Zernicke in 1932, made possible the observation of such objects by making visible small differences in optical path even though the objects studied were quite transparent.

In many cases, however, visualization is not enough; some measure of the optical path through an object is desirable. Examples are the determination of the depth of grooves in a transparent object, or measuring amounts of food injested by a living cell subjected to a particular stimulus. In order to make such measurements, the phenomenon of interference has been used. Two light beams are made to interfere, each having been affected in different ways by their passage through the microscope. In order to obtain high resolving power, a microscope must utilize a very divergent beam of light in the neighborhood of the object. This greatly restricts the design of an interferometer since in the absence of the object, the two beams must have nearly identical path lengths. Several types of interference microscopes have nevertheless been developed. Perhaps the simplest in principle is that in which there are twin microscopes, one with the object and one without. The light is split into two beams. One beam is sent through each microscope, the beams are recombined and the resulting interference fringes are observed. This system, the Mach-Zehnder, has been known since the beginning of the century, but has proven difficult to build and to adjust. Other systems exist in which the two beams traverse the specimen either in different planes of focus or in slightly different transverse paths. All of these yield interference fringes proportional to differences in adjacent optical paths, and so are sensitive, not to the actual optical path, but to its spatial derivative. Such methods often yield very beautiful detail, but are not adapted for quantitative measurements of the amount of material in the light path. There is thus need for an instrument which can yield a true measure of optical thickness and yet be more practical and also more adaptable to existing microscope designs.

SUMMARY OF THE INVENTION

Employing the usual laboratory microscope in which the microscope condenser, object to be studied, objective lens and eyepiece are in optical alignment, an infrared laser beam is made to pass through a frequency doubling platelet of nonlinear optical material which is placed between the microscope condenser and the object to be studied so as to produce a parallel beam at double the frequency of the laser beam and in the visible spectrum. Both the infrared beam and the visible beam pass through the transparent object. These beams are coparallel and their phases are related. A second frequency doubling platlet is placed after the object. Then an anti-infrared filter screens out the invisible laser beam. The two visible beams continue to the microscope eyepiece to provide an image. The two visible beams bear a definite phase relationship to each other, since each one has a definite relationship to the phase of the infrared laser beam from which it was derived. However, since only one visible beam passes through the sample, a phase difference results, and the phase difference of the two beams will be proportional to the difference in refractive index of the object at the wave length of the initial laser beam and at the wave length of a beam having one-half its frequency. Since both beams follow exactly the same path through the microscope, the principle is applicable to any optical microscope, no matter how powerful. The object may be oriented in any direction on the microscope stage, or other supporting means. The method is not limited to a completely transparent object, but is useful for objects which are substantially transparent, or nearly transparent. The object may include one or more substances or objects viewed together, or a conglomerate mass or cluster.

The method in its application to the living cell may require caution as to the tolerable intensity of the laser light. For biological research the optimum intensity is adjusted to that of a near-infrared beam tolerable by the living cell, taking into consideration the intensity of the green visible light required in order that the interference fringes will allow adequate measurement of the optical path.

DETAILED DESCRIPTION OF A PREFERRED EMBODIMENT

The single FIGURE of the drawing is a schematic illustration of the interference microscope of the present invention.

Radiation at 1.06 micrometers is produced by a glass-neodymium laser (beam A). This near-infrared radiation will pass without hindrance through glass lenses such as are found in condensers 10 and objectives 20 of standard microscopes. A frequency doubling platelet 14 of nonlinear optical material, such as KDP (potassium-dihydrogen phosphate) is placed between the condenser 10 and the object 12 to be studied. This platelet produces a small amount of second harmonic radiation at double the frequency of the laser light at 0.53 micrometers, which is in the green region of the visible spectrum, beam B. Both infrared beam A and green beam B pass through the object. Because of the nature of the process of frequency doubling, beams A and B are coparallel and their phases are related. In general, because of the dispersion which is a property of all materials, the optical thickness of the specimen will not be the same for the visible and the infrared beams. The second frequency doubling platelet 16 will also produce a small amount of second harmonic radiation. The thickness of the two platelets is adjusted so that the two visible beams B and C have the same (or nearly the same) intensity. All of the beams are colinear and all are related in phase. The infrared laser beam A is intercepted and prevented from reaching the eye by an anti-1.06 micrometer filter 18 of the same sort routinely used when personnal are working with 1.06 micrometer lasers. The two visible beams B and C continue and provide an image of the object at the microscope eyepiece 22 which is crossed with interference fringes. These fringes provide direct information on the optical path in the object since their phase difference is equal to the optical path times the difference in refractive index of the object at 1.06 and 0.53 micrometers.

This instrument is fully compensated; that is both the interfering beams follow exactly the same paths through the microscope.

The method depends on the fact that the two visible beams bear a definite phase relationship to each other. This will be true if each has a definite relationship to the phase in the infrared laser beam. This has been shown to be true by Chang et al. Phys. Rev. Lett. 15 6 (1965).

The phase shift is related to the geometric thickness of the object and varies with the wave length of the incident beam. Since only one visible beam passes through the object, the phase shift between the two will be proportional to the optical thickness of the object 12. The phase shift $\delta\phi$ is given by:

$$\delta\phi = \int_{x_2}^{x_1} (n_{ir} - n_v) dx$$

where $x_2 - x_1$ is the geometrical thickness of the sample, $n_{ir}$ is the index of refraction of the sample in the infrared at 1.06 micrometers and $n_v$ is its index of refraction in the visible at 0.53 micrometers.

While certain representative embodiments and details have been shown for the purpose of illustrating the invention, it will be apparent to those skilled in the art that various changes and modifications may be made therein without departing from the spirit and scope of the invention.

I claim:

1. An interference microscope based on the principles of non-linear optics for measuring optical thickness of a transparent object comprising a microscope having in optical alignment a condenser, objective lens, object to be viewed and eyepiece, in combination with one frequency doubling platelet positioned between said condenser and object;

a second frequency doubling platelet placed after said object; and an anti-infrared filter positioned after said second frequency doubling platelet;

to form an interference microscope in which the optical thickness of said object oriented in any direction is determined quantitatively by passing an invisible infrared laser beam from said condenser and through the microscope to provide a visible image in which the phase shift of the resultant two visible beams appearing at the eyepiece is measured and the optical thickness is calculated.

2. The interference microscope of claim 1 wherein the calculation is made using the formula:

$$\delta\phi = \int_{x_2}^{x_1} (n_{ir} - n_v) dx$$

where $x_2 - x_1$ is the geogetrical thickness of the sample, $n_{ir}$ is the index of refraction of the sample in the infrared at 1.06 micrometers and $n_v$ is its index of refraction in the visible at 0.53 micrometers.

3. The interference microscope of claim 1 wherein said invisible infrared laser beam is produced by a glass-neodymium laser.

4. The interference microscope of claim 1 wherein the near infrared laser beam has a frequency of 1.06 micrometers.

5. The interference microscope of claim 1 wherein the resultant second harmonic radiation has a frequency of 0.53 micrometers.

6. The interference microscope of claim 1 wherein said frequency doubling platelets are platelets of potassium dihydrogen phosphate.

7. The interference microscope of claim 1 wherein said object is a living biological sample.

8. The interference microscope of claim 1 wherein said object is a transparent non-biological sample.

9. The interference microscope of claim 1 wherein said object is a conglomerate mass.

10. The interference microscope of claim 1 consisting essentially of a microscope having in optical alignment a microscope condenser, frequency-doubling platelet, means of supporting an object, second frequency doubling platelet, microscope objective lense, anti-infrared filter and microscope eyepiece, the assembly as a whole being arranged for microscopic examination of transparent objects.

* * * * *